US005249949A

United States Patent [19]

Aslam et al.

[11] Patent Number: 5,249,949

[45] Date of Patent: Oct. 5, 1993

[54] APPARATUS FOR TEXTURIZING TONER IMAGE BEARING RECEIVING SHEETS

[75] Inventors: Muhammad Aslam, Rochester; Thomas J. Farnand, Webster; Ernest J. Tamary, Brighton, all of N.Y.

[73] Assignee: Eastman Kodak Company, Rochester, N.Y.

[21] Appl. No.: 688,761

[22] Filed: Apr. 22, 1991

Related U.S. Application Data

[62] Division of Ser. No. 405,175, Sep. 11, 1989, Pat. No. 5,023,038.

[51] Int. Cl.[5] .......... B29C 59/04; B28B 11/08

[52] U.S. Cl. .......... 425/385; 355/290; 430/99

[58] Field of Search .......... 425/155, 385; 264/293; 430/47, 99, 124, 126; 355/266, 290

[56] References Cited

U.S. PATENT DOCUMENTS

| | | | |
|---|---|---|---|
| 2,849,752 | 9/1958 | Leary | 264/293 |
| 3,338,731 | 8/1967 | Somer | 264/293 |
| 3,591,276 | 7/1971 | Byrne | 355/3 |
| 3,685,896 | 8/1972 | Kaupp | 355/3 |
| 3,851,964 | 12/1974 | Smith et al. | 355/10 |
| 3,893,761 | 7/1975 | Buchan et al. | 355/3 R |
| 4,211,743 | 7/1980 | Nauta et al. | 425/363 |
| 4,337,303 | 6/1982 | Sahyua et al. | 430/11 |
| 4,455,079 | 6/1984 | Miwa et al. | 355/3 TR |
| 4,518,976 | 5/1985 | Tarami et al. | 346/153.1 |
| 4,531,825 | 7/1985 | Miwa et al. | 355/3 TR |
| 4,639,405 | 1/1987 | Franks | 430/124 |
| 4,761,311 | 8/1988 | Stone et al. | 118/60 |
| 4,780,742 | 10/1988 | Takahashi et al. | 355/3 FU |
| 4,927,727 | 5/1990 | Rimai et al. | 430/99 |
| 4,954,297 | 9/1990 | Beery et al. | 264/1.3 |
| 4,968,578 | 11/1990 | Light et al. | 430/126 |

FOREIGN PATENT DOCUMENTS

| | | |
|---|---|---|
| 0295901 | 6/1988 | European Pat. Off. . |
| 0301585 | 7/1988 | European Pat. Off. . |
| 63-92965 | 4/1988 | Japan . |

*Primary Examiner*—Jay H. Woo
*Attorney, Agent, or Firm*—Leonard W. Treash

[57] ABSTRACT

A toner image carrying thermoplastic layer on a receiving sheet is texturized from the back side of the sheet by positioning the sheet between a smooth hard surface and a texturizing surface with the texturizing surface contacting the back side. The thermoplastic layer is softened by heat and becomes texturized without embossing the back side. A curl preventing layer on the back side is not embossed because it has a melting point above the temperature of the process. A glossy-textured print can be produced this way. The process is especially useful in making multicolor prints of photographic quality.

12 Claims, 4 Drawing Sheets

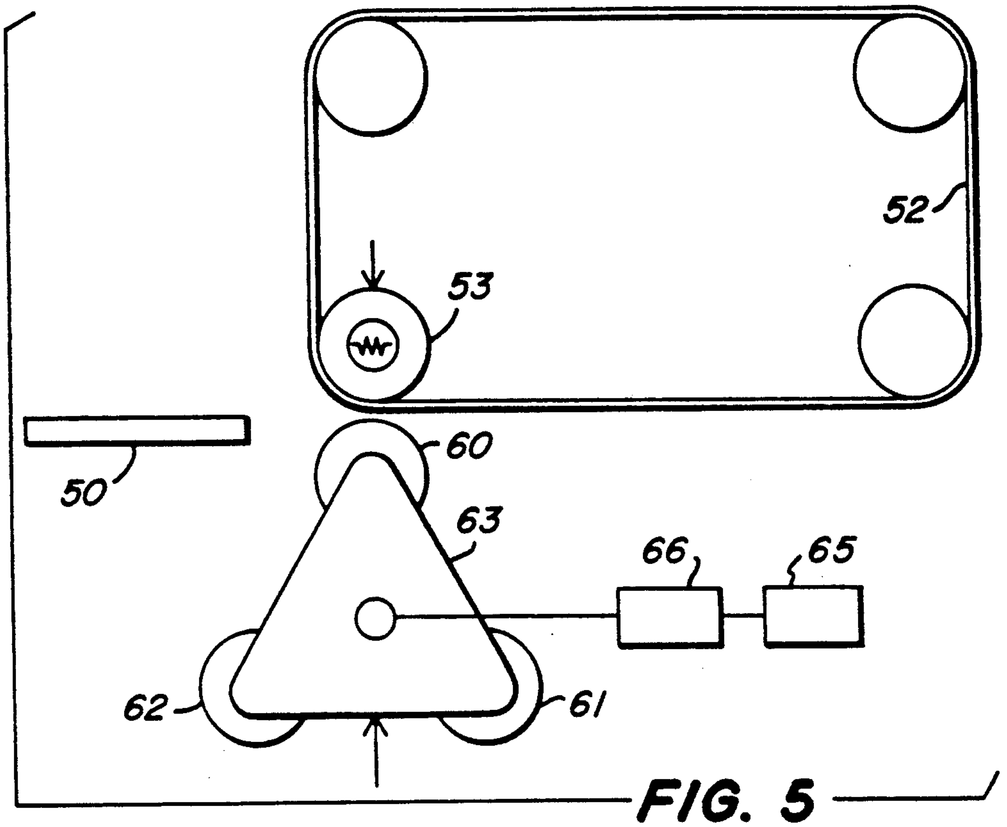
FIG. 5
FIG. 6
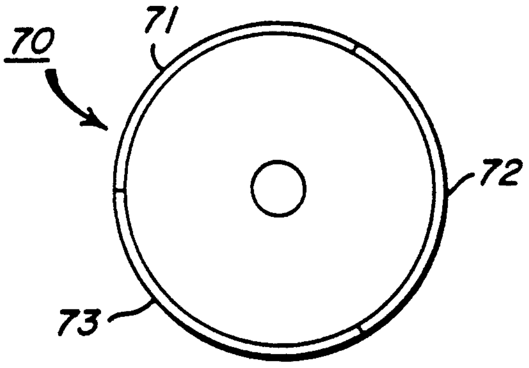
FIG. 7
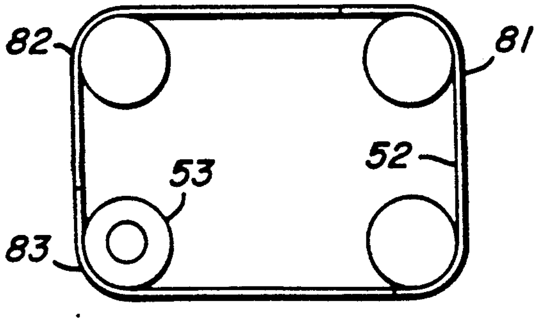

APPARATUS FOR TEXTURIZING TONER IMAGE BEARING RECEIVING SHEETS

This is a divisional of application Ser. No. 07/405,175, filed Sep. 11, 1989 now U.S. Pat. No. 5,023,038.

TECHNICAL FIELD

This invention relates to the finishing of toner images and more particularly to a method and apparatus for imparting a texture to a toner image carried on a support.

RELATED APPLICATIONS

This application is related to co-assigned: U.S. patent application Ser. No. 07/405,258, filed Sep. 11, 1989 and now U.S. Pat. No. 5,089,363, TONER FIXING METHOD AND APPARATUS AND IMAGE BEARING RECEIVING SHEET, Donald S. Rimai et al.

U.S. patent application Ser. No. 07/688,762, filed Apr. 22, 1991, Aslam et al and now U.S. Pat. No. 5,087,536.

BACKGROUND ART

Traditional photofinishing operations for photographic color images provide the consumer with a variety of textures to the surface of the image in addition to the usual glossy print. In traditional silver halide photography the texture is applied to the surface of the receiving paper in its manufacturing process and survives liquid processing and drying in the photofinishing operation.

In electrophotography, multicolor images having resolution and other qualities comparable to those of silver halide photography have been produced in the laboratory. One reason such systems have not been commercially practical is they have generally required liquid developing for high quality. However, recent advances in fine particle dry toners have made low grain, high resolution images feasible with dry systems.

One of the problems associated with such systems is that of providing the customer a variety of textures to the image comparable to that available with ordinary photofinishing. Highest quality dry color imaging is accomplished with a receiving sheet having a thermoplastic layer which can be texturized. However, the fixing and other treatments associated with dry electrophotography involve the application of heat and pressure which would adversely affect any texture imparted to such a receiving sheet in its manufacturing operation.

U.S. Pat. No. 4,639,405 shows a post-treatment step to add gloss to a toner image carried on paper after ordinary fusing. The fixed image-bearing paper is dried and then pressed between a pair of heated rollers which increase the gloss of the image. At least one of the rollers has a resin coating to provide some width of nip to aid in heat transfer. A purpose for the drying step is to prevent blistering from steam escaping around the nip when coated paper is used as the receiving sheet.

U.S. Pat. No. 4,780,742 shows a method of increasing the gloss of a fixed toner image by coating it with a thin sheet in the presence of heat and pressure. The thin sheet packs the image and fuses it together, increasing gloss and removing surface roughness. The sheet is cooled and peeled off. The image appears to be fused on top of the support and has a principle object of providing less scattering for color images on transparencies.

European patent application 0 301 585 published Feb. 1, 1989, shows a glazing sheet used to increase the gloss of either a toner image on a paper backing or a dye and developer in a thermoplastic coating. The glazing sheet is pressed against the paper sheets with moderate pressure and the dye-thermoplastic sheets with substantial pressure. The glazing sheet can be either smooth for a high gloss or dull for a low gloss finish. In one embodiment, the glazing sheet has both high and low gloss sections that can be selected.

In the latter two references the image and sheet are allowed to cool before separation. This approach to preventing release in pressure fixing is shown in a large number of references; see, for example, European patent application 0 295 901 and U.S. Pat. No. 3,948,215.

U.S. Pat. No. 4,337,303 suggests a method of thermal transfer involving bringing a receiving sheet having a thermoplastic coating into contact with fine toner images in the presence of sufficient heat to soften the thermoplastic coating. The toner is said to be "encapsulated" by the thermoplastic coating under moderate pressure.

DISCLOSURE OF THE INVENTION

It is the object of the invention to provide a method and apparatus for applying a texture to a toner image carried on a support.

It is an object of a preferred embodiment of the invention to provide such a method and apparatus for texturizing such an image which conveniently permits a plurality of textures to be alternatively and interchangeably employed.

It is another object of a preferred embodiment of the invention to provide a method and apparatus for fixing and texturizing a toner image on a support in one step.

It is also an object of a preferred embodiment of the invention to provide a new texturized toner image.

According to one aspect of the invention, these and other objects are accomplished by placing a support having a heat softened thermoplastic layer carrying a toner image, between first and second pressure members, the first member contacting the thermoplastic image bearing layer and the second member contacting the back of the sheet, the second member having a texturizing surface, and applying sufficient pressure between said pressure members to impart a texture to the image and the thermoplastic layer which texture corresponds to said texturizing surface.

According to a preferred embodiment of the invention a texture is imparted to a toner image on a surface of a receiving sheet by positioning a smooth ferrotyping web in contact with the image. The texturizing surface is the surface of a backing roller which contacts the surface of said sheet opposite the image. With such a structure the roller can be readily changed to change texturizing surfaces, whereas changing the web would be far more cumbersome.

According to a further preferred embodiment of the invention the invention is used with an unfixed toner image on a thermoplastic layer on a suitable support. While the ferrotyping material is embedding the toner in the soft thermoplastic, the backing roller is texturizing the thermoplastic surface thereby fixing and texturizing in one step.

According to a further preferred embodiment, three different rollers having different texturizing surfaces are positioned on a turret which turret is rotatable to bring the desired texturizing surface into contact with the opposite side of the support from the image.

It is unexpected to those skilled in the art of fixing and finishing electrophotographically produced toner images that the thermoplastic surface and toner images that the thermoplastic surface and toner image could be texturized from the backside of the sheet, especially with high pressures, without embossing the support.

According to another embodiment of the invention, the receiving sheet has a curl preventing layer on its side opposite the thermoplastic layer which curl preventing layer has a sufficiently high melting temperature not to offset onto or be embossed by the pressure member contacting it.

It is also an aspect of a preferred embodiment of the invention that a smooth ferrotyping web with a texturized backing roller can produce a new texturized finish that is a mixture of glossy and texture.

BRIEF DESCRIPTION OF THE DRAWINGS

In the detailed description of the preferred embodiment of the invention presented below reference is made to the accompanying drawings, in which:

FIG. 5 is a side section of another embodiment of a texturizing apparatus.

FIG. 6 is an end view of a texturizing backup roller usable in the texturizing apparatus shown in FIG. 4.

FIG. 7 is a side view of an endless web texturizing component usable as an alternative to the embodiment shown in FIG. 4 or FIG. 5.

THE BEST MODE OF CARRYING OUT THE INVENTION

Figure 1:
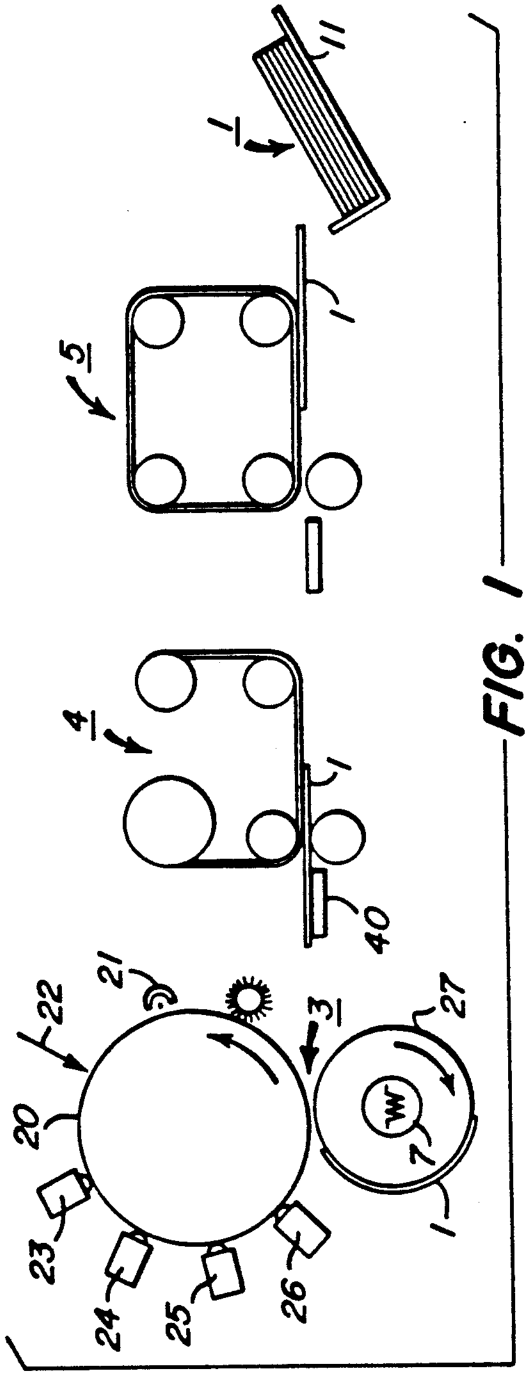
FIG. 1 is a side schematic view of an apparatus for producing finished multicolor toner images.

According to FIG. 1 a receiving sheet 1 is fed along a path through a series of stations. The receiving sheet 1 is shown in section in FIG. 2 and has a paper support 10 with a readily softenable thermoplastic layer 9 coated on its top side. Preferably, the paper support 10 also has a curl preventing coating 8 on its bottom side. These materials will be explained in more detail below.

Receiving sheet 1 is fed through a path past an image transfer station 3, a fixing station 4, texturizing station 5 and into a receiving hopper 11.

A multicolor toner image can be formed by a number of means on receiving sheet 1. For example, according to FIG. 1, a photoconductive drum 20 is uniformly charged at a charging station 21 exposed by a laser, an LED or an optical exposure device at exposure station 22 and toned by different color toning stations 23, 24, 25 and 26. Consistent with conventional color electrophotography, consecutive images are toned with different colors by toning stations 23-26. The consecutive images are then transferred in registry to the surface of receiving sheet 1 at transfer station 3 where sheet 1 is secured to transfer roller 27 and repetitively brought into transfer relation with the images to form a multicolor toner image thereon. Single color images can also be formed by the same apparatus.

Extremely high quality electrophotographic color work with dry toner particles requires extremely fine toner particles. For example, images comparable to photographic color prints have been produced with toner particles having an average diameter less than 8 μM, and especially less than 3.5 μM. Because of difficulties encountered in electrostatically transferring such small toner particles, transfer station 3 is preferably of the thermally assisted type, in which transfer is accomplished by heating both the toner and the thermoplastic layer of the receiving sheet causing preferential adherence between the toner and receiving sheet as compared to the toner and whatever surface is carrying it, in this instance photoconductive drum 20. For this purpose transfer roller 27 is heated by a lamp 7 which heats the thermoplastic layer 9 to its glass transition temperature which assists in the transfer of the toner to layer 9 by partially embedding the toner in layer 9.

A multicolor image can also be formed using an intermediate drum or web to which two or more color toners are transferred in registry and then transferred as a single multicolor image to a receiving sheet. Sheet 1 can also receive a multicolor image directly from drum 20 in a single transfer if that image is formed on photoconductive drum 20 by a known process which exposes and develops second, third and fourth color images on top of previously formed color images. In summary, any of a number of known techniques may be used to provide a multicolor image of dry, extremely fine toner particles on or slightly embedded in the upper thermoplastic surface of receiving sheet 1.

Figure 2:
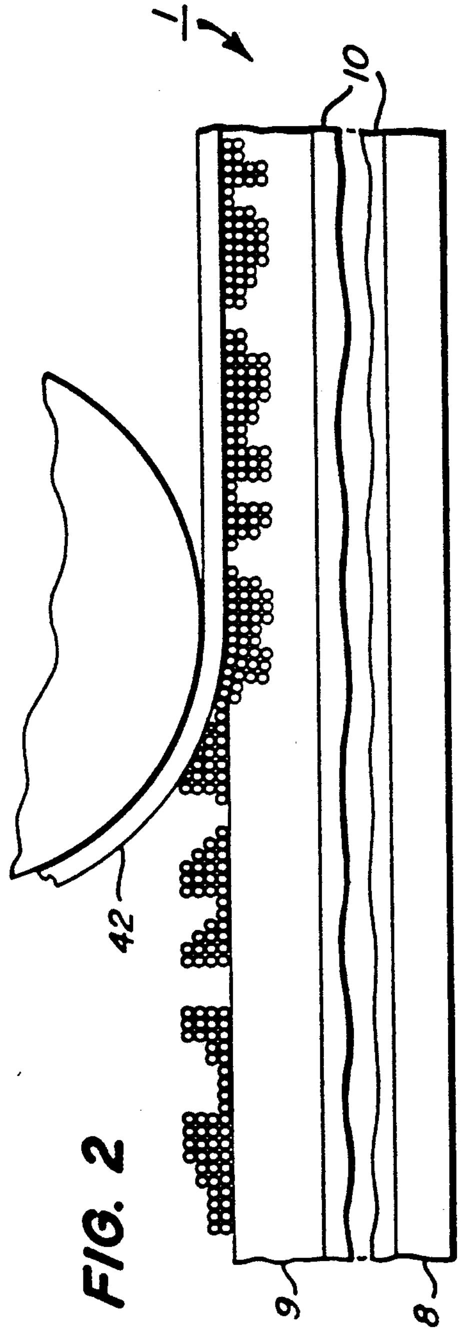
FIG. 2 is a side section greatly magnified illustrating the fixing of multicolored toner images as carried out by the apparatus of FIG. 1.

Referring to FIG. 2, these finely divided toner particles (exaggerated in size in FIG. 2) have a tendency to extend in layers a substantial and varying height above the surface of receiving sheet 1. Ordinary pressure roller fusing has a tendency to flatten somewhat the layers of toner, but also spreads such layers, increasing substantially the granularity of the image and noticeably impairing its quality. Further, the fine toner has a tendency to offset on the pressure fuser unless fusing oils are used. Such fusing oils, while acceptable for ordinary copying work, leave blotches on the sheet surface that are unacceptable for photographic quality imaging. Pressure roller fusers using one hard roller and one more resilient roller to create a substantial nip for acceptable heat transfer also leave a noticeable relief image in the print, which for photographic quality is an unacceptable defect. With receiving sheets that are coated on both sides, blistering with such fusers is a significant problem.

Prior infrared heaters do not have the tendency to spread the toner layers to the extent that pressure roller fusers do, but do not in any way contribute to the reduction of relief. Such fusers rely totally on melting of the image which, in itself, causes some flow and also coalescence and some loss of resolution. Such heaters are inefficient, create fire hazards and require radiation shielding.

Figure 3:
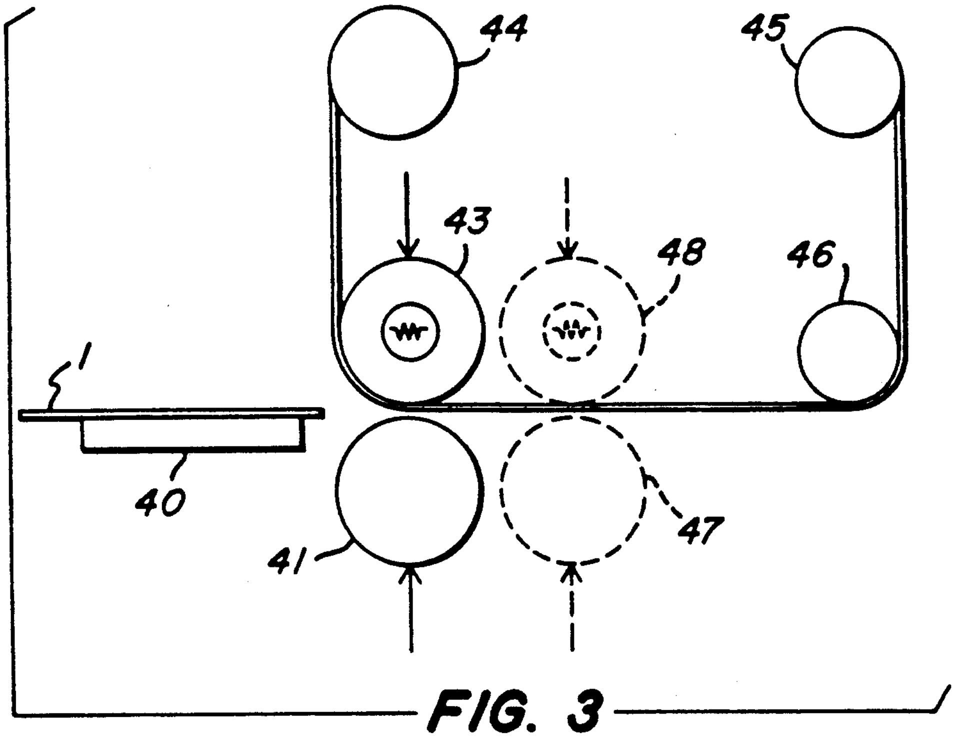
FIG. 3 is a side section of a fixing apparatus incorporated in the apparatus of FIG. 1.

Fixing station 4 is best shown in FIG. 3, where receiving sheet 1 is heated by preheating device 40 sufficiently to soften or to approach softening thermoplastic layer 9 on paper support 10. Preheating device 40 is shown as an ordinary conduction heating device which heats thermoplastic layer 9 through paper support 10. Other known heating devices could be used, for example, an infrared heating device on the upper side of receiving sheet 1 which directly heats layer 9. Receiving sheet 1 with thermoplastic layer 9 heated to or nearly to its softening point, now passes between a backing roller 41 and a ferrotyping web 42 pressed against receiving sheet 1 by a roller 43 which is also heated to prevent the cooling of thermoplastic layer 9 below its softening point or to finish raising the temperature of the thermoplastic to or above its glass transition temperature. Rollers 41 and 43 are urged together with substantial force to create substantial pressure between ferrotyping web 42 and toner image and layer 9.

With layer 9 softened by heat, the toner is pushed into it, totally embedding itself in layer 9. This action is shown best in FIG. 2, where the toner image is first shown, at the left, to have substantial relief characteristics as it is piled in layers on top of now softened layer 9. Although the toner image is shown as entirely on top of layer 9, if thermal assisted transfer was used at transfer station 3, some of the toner may be already partially embedded in layer 9. However, at the present state of the art, that transfer step with most materials is not capable of completely fixing the toner image. Accordingly, as shown in FIG. 2, ferrotyping web 42 pushes all of the layers of toner into thermoplastic layer 9 allowing the thermoplastic to flow over the toner thereby fixing the image. It has been found that with substantial pressures and appropriate temperatures this method of embedding toner in the layer 9 provides an image which is well fixed, has high gloss, and is free of noticeable relief. Because the toner is fixed by being pushed into the layer 9, it does not spread and does not destroy the sharpness or noticeably increase the granularity provided by the fine toner particles.

In conventional fusing systems one (or both) roller is somewhat compliant to create a wide nip to allow sufficient heating area. Unfortunately, the wide nip prevents obtaining sufficiently high pressure to remove the relief in these materials. Such conventional fusing systems typically provide gloss levels less than 20. Also, when using coated papers, the wide nip causes overheating, and thereby contributes to blisters as the receiving sheet leaves the nip.

Similarly, conventional fusing systems use a fusing oil to prevent adhesion of the image to the roller contacting it. With a thermoplastic layer on the receiving sheet, such adhesion is even more likely. Unfortunately, the use of oil adversely affects image quality and leaves an oily coating on the receiver which is unacceptable in photographic grade reproduction.

According to FIG. 3 the ferrotyping web 42 contacts the image and the thermoplastic coating over a substantial distance. The ferrotyping web 42 is a smooth, hard web having low surface energy. It can be in the form of an endless belt (FIG. 4) or a spooled web (FIG. 3). Preferably, it should have a surface energy less than 47 ergs/cm$^2$, preferably less than 40 ergs/cm$^2$ and a Youngs modulus of $10^8$ Newtons/m$^2$ or greater. The FIG. 3 embodiment shows web 42 mounted around a series of rollers, including roller 43, a supply roller 44, a takeup roller 45 and a separating roller 46. Web 42 is driven at the same speed as receiving sheet 1, either by driving one of the rollers, for example, takeup roller 45, or by allowing receiver 1 to drive web 42 through friction. Preferably, web 42 is driven by roller 43 which is part of the pair of rollers 41 and 43 which applies the primary pressure to the system. A tensioning drive (not shown) is applied to takeup roller 45 to maintain proper tensions in the system. Rollers 41 and 43 apply substantial pressure to the interface between ferrotyping web 42 and receiver 1.

Rollers 41 and 43 are preferably hard metallic rollers to maintain pressures in the nip not ordinarily obtainable using compliant rollers. For good results the pressure should be 100 pounds per square inch or greater. Above 100 psi further improvement is seen with greater pressure. For example, sufficient force can be placed between rollers 43 and 41 if both have a hard metallic surface to create a pressure in the nip between web 42 and sheet 1 in excess of 300 pounds per square inch. Excellent results have been obtained at pressures in excess of 1,000 pounds per square inch.

Preheating device 40 is used to soften the thermoplastic layer 9 on the receiving sheet 1. One or both of rollers 41 and 43 is also heated to raise or maintain the temperature of the thermoplastic layer above its glass transition temperature which permits forcing the toner into the thermoplastic layer. Preferably, roller 43 is hard and is heated, and web 42 wraps a portion of roller 43 to allow roller 43 to preheat web 42. Preferably, roller 41 is unheated, which lessens the probability of a thermoplastic backing 8 adhering to roller 41, a problem discussed below.

After receiving sheet 1 has passed through the area of heaviest pressure and heat between rollers 41 and 43, both it and ferrotyping web 42 begin to cool. As the thermoplastic layer on receiving sheet 1 cools below its glass transition temperature, the toner becomes fixed in the thermoplastic layer and loses its tendency and the tendency of the thermoplastic layer to release with web 42. Therefore, when web 42 is separated from receiving sheet 1 at separating roller 46, the image and thermoplastic layer 9 are not retained by it. The resulting image is well fixed, has high resolution and has a high gloss. The toner has become entirely embedded in the thermoplastic and the thermoplastic has formed over it. The thermoplastic prevents light scattering by the toner particles and provides the high gloss, from ferrotyping web 42, while the toner does not flow or spread and maintains its integrity providing substantially its original low granularity.

An additional set of rollers 47 and 48, identical to rollers 41 and 43, can be used to further apply gloss and fixing to the image.

In some high quality applications, adding an extra heating source between rollers 48 and 46 gives the thermoplastic an opportunity to relax while heated. Although it still must cool before separation, this approach reduces a phenomena known as "deglossing".

If a finish other than high gloss is desired on the image, a texturizing surface can be formed on the ferrotyping material 42 to impart lower gloss finishes such as satin, silk screen, or the like. Approaches to texturizing are discussed more thoroughly below.

Ferrotyping web 42 can be made of a number of materials. Both metals and plastics have been successfully used. For example, a highly polished stainless steel belt, an electroformed nickel belt, and a chrome plated brass belt both have both good ferrotyping and good release characteristics. However, better results have been obtained with conventional polymeric support materials such as polyester, cellulose acetate and polypropylene webs. Materials marketed under the trademarks Estar, Mylar and Kapton F give gloss levels extending into the 90's.

Metal belts coated with heat resistant low surface energy polymers have also been found to be effective in this process. For example, a number of unfilled, highly crosslinked polysiloxanes are coated on a metal support, for example, stainless steel. The metal support provides the hardness required while the coating contributes to the low surface energy. The metal also provides durability. Experiments were carried out with five commercially available, heat curing, hard silicone resins supplied as 50% solid in xylene or xylene/toluene mixed solvents. The stainless steel belt alone provided a gloss level of 37. With the resin coatings, gloss levels varied from 57 to 95 with very few image defects. As mentioned above, the same images with conventional roller fusers provide gloss levels well under 20 and require silicone oils which create serious image defects.

The thickness of the ferrotyping web is not critical, but it should be thin enough to allow heat transfer but thick enough for durability. A polypropylene film support utilized for this purpose would comply with these requirements by being between 1 and 4 mils thick. It is important that the ferrotyping material have a surface energy that is low enough to provide appropriate separation at separation roller 46. For this purpose a surface energy of less than 47 ergs per centimeter$^2$ is preferred and especially preferred is a surface energy of less than 40 ergs/cm$^2$. Many low surface energy materials are too soft to be sufficiently smooth to impart a glossy finish; therefore, materials should be sufficiently hard to impart the desired finish. Preferably, the web should have a Young's modulus of $10^8$ Newtons/m$^2$ or greater.

Although we have found acceptable results by merely allowing the materials to cool prior to separation under ambient conditions, high speed cooling can be assisted by special cooling devices, such as blowers and the like (not shown).

As mentioned above, best results are obtained with both rollers 41 and 43 as hard rollers thereby providing the greatest pressure, i.e., 300 psi or greater. However, good results have been obtained in less demanding applications (such as black and white and less demanding color reproduction) with roller 41 or roller 43 or both slightly compliant with a very thin coating of elastomeric material on an aluminum base which will provide a slight width to the nip. Depending on the thickness of the coating or coatings, pressures in the lower portion of the acceptable range can be obtained in this manner, for example, between 100 and 300 psi.

The thermoplastic coating 9 is heated above its glass transition temperature by the preheating device 40 and the rollers, preferably roller 43 and ferrotyping web 42. With a thermoplastic layer 9 having a glass transition temperature between 45° and 70° C., we have obtained good results raising its temperature to approximately its glass transition temperature by preheating alone. It is preferable, although not necessary, that the toner have a glass transition temperature above that of the thermoplastic, for example, between 55° and 70° C. If the ferrotyping web is maintained at 105° C. as it approaches the nip, some of the toner will soften. But at any of these temperatures, layer 9 is more soft and the toner embeds without spreading. If separation occurs only after the thermoplastic is again below the glass transition temperature, exact control over the temperature in the nip is not critical.

The preheating step reduces the need for substantial temperature transfer by the ferrotyping material. Because heat transfer is difficult with a narrow nip, this allows the use of hard rollers 41 and 43 which facilitates application of greater pressure and makes substantial fixing speeds possible.

Further, we have found that the tendency of the thermoplastic layer to degloss is less if a substantial preheating step is used. This is believed to be due to greater stabilization of the thermoplastic when hot due to a preheating step that by its nature is more gradual.

Of perhaps more importance than these considerations is a substantial lessening of the tendency of the receiving sheet to blister if preheated. Blistering is caused by moisture in the paper turning to steam and trying to escape. It can escape ordinary paper without problem. However, the coatings 8 and 9 are more restrictive to its passage and will have a tendency to blister in the nip between ferrotyping web 42 and roller 41. These layers will pass moisture at a slow rate. The more gradual heating at preheating device 40 permits much of the moisture to escape without blistering prior to the nip and lessens the blistering effect of an abrupt rise in temperature in the nip.

It is well known in the photographic and printing arts to coat opposite sides of image bearing sheets with similar materials to prevent those materials from curling. Thus, while uncoated paper would not curl, once thermoplastic layer 9 is added, the difference in the reaction to heat and humidity of paper and the thermoplastic will tend to cause the paper to curl in changing conditions. For this reason, layer 8 is added to the opposite side which offsets the curl producing tendency of layer 9 and also keeps moisture in the paper, making it more like most environments.

In the photographic art, layer 8 would ordinarily be of the exact same material and thickness as layer 9. However, we have found that curl can be prevented by using a similar material to that of layer 9, but with some properties advantageously different. More specifically, in the process shown in FIG. 1 a material having similar curl characteristics to layer 9 can be applied as layer 8 but with a significantly higher melting point. For example, a polyethylene or polypropylene layer 8 having softening and melting points 115° C. or greater and of proper thickness will substantially counter the curl tendency of a thermoplastic coating 9 having a glass transition temperature between 45° and 70° C. and of a particular thickness. With such a structure, offset of layer 8 onto roller 41 (and roller 47), preheating device 40 and, perhaps most important, transfer roller 27 is prevented. If layer 8 were of the same material as layer 9, it would be necessary to either provide a liquid release agent to roller 41 (and transfer roller 27 and preheating device 40) or provide an endless web similar to web 42 for contact with layer 8. To exactly counter the tendency of layer 9 to curl the paper in one direction, the density of layer 8 can be adjusted. Such precision does not appear to be necessary.

For example, high grade photographic paper stock coated with a 1.0 mil polyethylene coating on its back side was coated on the other side with a 0.5 mil coating of a polystyrene thermoplastic, marketed by Goodyear under the tradename Pliotone 2015 which has a glass transition temperature between 50° and 60° C. The polyethylene has melting and glass transition temperatures above 115° C. A multicolor toner image of toners having a glass transition temperature between 55° and 65° C. was formed on the thermoplastic layer. The sheet was heated to between 55° and 60° C. by preheating device 40 and fed at a rate of 35 mm./sec between a ferrotyping web 42 of 3 mil polypropylene having a melting point in excess of 200° C. Web 42 was backed by a metal roller 43 heated to a temperature of 105° C. The receiving sheet was backed by an unheated metal roller 41. A pressure of approximately 300 psi was applied. High quality prints were obtained with very low granularity using toners of average diameter of approximately 3.5 microns. Neither surface of the receiving sheet had a tendency to offset onto web 42 or roller 41. The sheets did not have a tendency to curl when subjected to normal temperature and humidity changes. With a preheating device long enough to allow contact with receiving sheet 1 of at least one second, good results at faster times (in excess of 200 mm./sec) were also achieved. Without preheating device 40, it was difficult to get good results above 10 mm./sec.

With most materials, when the receiver 1 leaves web 42 at roller 46 it has a permanent high gloss above or approaching 90. However, with some materials, the gloss and its permanence can be improved by a second treatment similar to the first. Similarly, textures, such as "matte", "satin" or "silk screen", can be imparted to the surface of receiver 1 by applying a texturizing surface to web 42, thereby both fixing and texturizing the surface in one step. Again, for some materials and finishes, the lack of smoothness of a texturizing web prevents it from doing as good a job of embedding toner in layer 9 as a smooth hard ferrotyping web. For such materials it is best to embed at station 4 and texturize at station 5 in a separate step.

Figure 4:
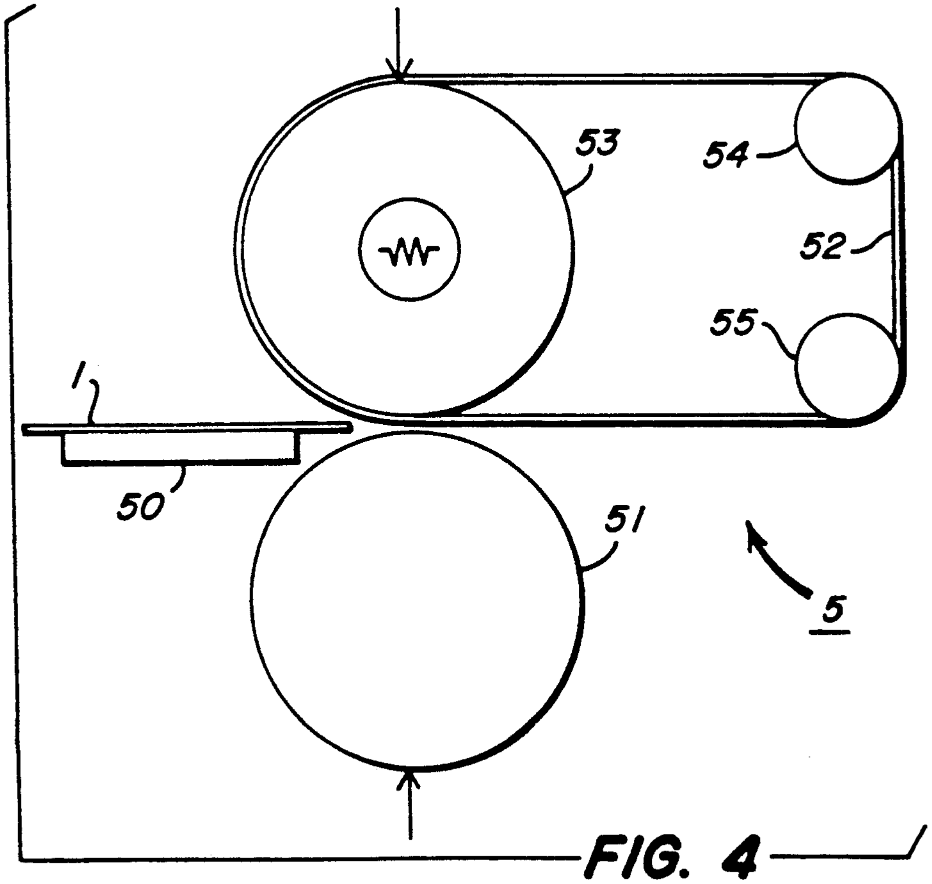
FIG. 4 is a side section of an embodiment of a texturizing apparatus incorporated in the apparatus of FIG. 1.

According to FIG. 4, texturizing station 5 can be constructed substantially like fixing station 4. As shown in FIG. 4, a ferrotyping web 52, in the form of a belt, is trained about a heated roller 53 and unheated rollers 54 and 55. Heated roller 53 forms a nip with an unheated roller 51. Receiving sheet 1 is fed across a preheating device 50 and into the nip between ferrotyping web 52 and roller 51 which are also pressed together with pressure of 100 psi or greater. Heated roller 53 and preheating device 50 raises the temperature of the thermoplastic layer on receiving sheet 1 above its glass transition temperature. According to one embodiment of the FIG. 4 structure, ferrotyping web 52 has a texturizing surface which imparts a texture to the image and the thermoplastic layer. Ferrotyping web 52 and thermoplastic layer 9 are allowed to cool as they move together to the right, as shown in FIG. 4, until they are separated at separation roller 55 as the ferrotyping web 52 makes an abrupt turn. Utilization of texturizing station 5 in addition to fixing station 4 not only adds a quality texture, for example, a satin or silkscreen finish, but with some hard to fix materials it also improves the permanence of the gloss or texture of the image surface.

Although excellent results are obtained with the apparatus just described with respect to FIG. 4, an alternative to that approach has some remarkable advantages. We have found that ferrotyping web 52 can be maintained with its original smooth and hard (glossy, nontexturizing) finish and a texturizing surface applied to roller 51 which, in this process, will impart texture to the thermoplastic surface on receiving sheet 1 through both the paper support and layer 8 without substantially embossing the paper or layer 8 *itself*. Roller 51 should be a hard metal roller, for example, chrome covered aluminum.

This approach has many advantages over applying the texturizing surface to web 52 itself. One of those advantages is illustrated in FIG. 5 where roller 51 is replaced by three texturizing rollers 60, 61 and 62, which are carried on a turret mechanism 63. Turret mechanism 63 is rotatable to position any of texturizing rollers 60, 61 or 62 in operative position with respect to receiving sheet 1 and heated roller 53. Thus, an operator utilizing a suitable logic and control unit 65 can actuate a motor 66 which rotates turret 63 to position one of rollers 60, 61 and 62 in operative position according to which texture the operator wishes.

A second advantage of applying the texture using a texturizing surface that contacts the opposite or rear side of the support rather than the surface to be texturized, is that the structure, as originally described with respect to FIG. 4, necessitates a texturizing web 52 which had much more surface area to be formed into a texturizing surface. Switching to a different texture then involves changing web 52 rather than roller 51. Applying a particular texture to web 52 is more expensive per se, than to roller 60; the web is more expensive to have alternates of; and changing webs is also a more demanding task.

It is possible to texturize and fix with a texturizing web 42. But, in many applications fixing is locally not as good with a texturizing web rather than a smooth web. Thus, another advantage of applying the texture with a smooth surface contacting layer 9 and the texturizing surface contacting the opposite or back side, is that texturizing and fixing is more readily accomplished in a single step. That is, fixing station 4 is eliminated and the smooth ferrotyping web 52 embeds the toner in the heat softened thermoplastic while the texturizing surface of roller 51 imparts a texture to the thermoplastic.

If a texture is going to be applied from the rear as described, it is important that the rear of receiver 1 not be softened by the heat. If it is plane paper, that is no problem. However, if as described above, a polymeric or other layer 8 is used to prevent curl, that layer should have a higher melting or softening temperature than layer 9. The previously described example in which layer 9 is a thermoplastic with a glass transition temperature between 45° and 70° C. and layer 8 is a polyethylene or polypropylene layer having softening and melting points in excess of 115° C. provide a matte finish in layer 9 without permanently affecting layer 8 with reasonable control of temperature in the nip, for example, with the surface of web 52 heated to 105° C.

Further, with a textured roller 51 and a smooth gloss applying web 52, the textured surface on layer 9 has what might be called a "glossy-textured" surface. That is, it gives the texture desired but with a gloss to it. This is a result not believed possible with regular texturization from the front by texturizing with web 52. We believe the product produced by this method, for example, a "glossy-matte" finish, is a new product, per se.

FIGS. 3, 4 and 5 illustrate another aspect of ferrotyping webs 42 and 52. Such ferrotyping webs can be either endless webs, as illustrated in FIGS. 4 and 5, or can be a web having ends and using supply and takeup rolls, as shown in FIG. 3. Either approach is usable in either stations 4 or 5. The webs are reusable, although in some applications, cleaning, on line or off line, may be desirable.

Figure 8:
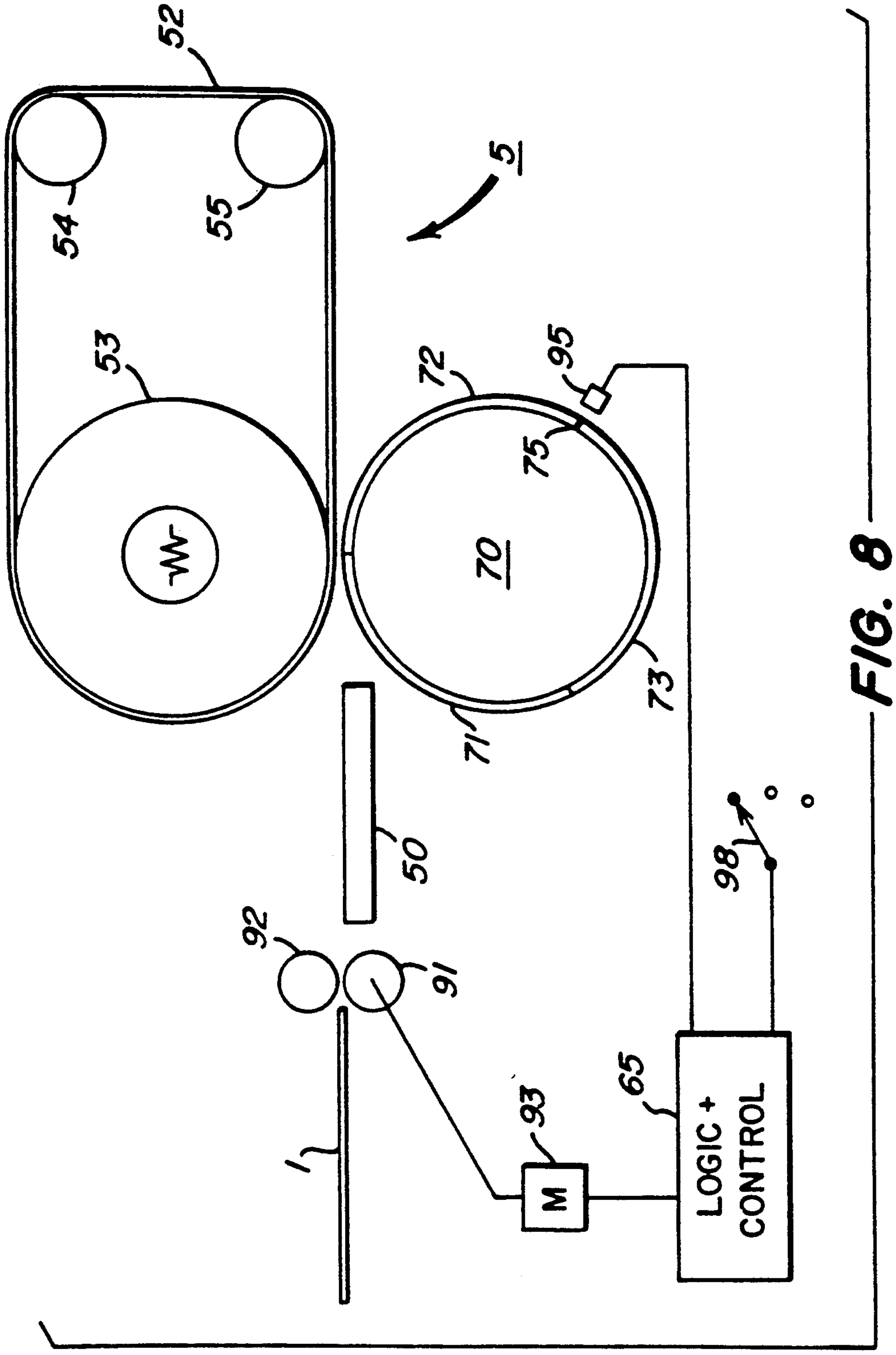
FIG. 8 is a side view of another embodiment of a texturizing apparatus particularly illustrating its timing mechanism.

FIGS. 6, 7 and 8 illustrate a texturizing approach that is usable with either a front side or back side approach to texturizing. According to FIG. 6 a single roller 70 is substituted either for the roller 51 in FIG. 4 or the turret 63 in FIG. 5. Roller 70 has an endless outer surface made up of three separate texturizing surfaces 71, 72 and 73. For example, surface 71 can be smooth to impart a glossy finish, surfaces 72 and 73 can be patterned to form satin and silkscreen finishes, respectively. Roller 70 allows the operator to pick from these three different texturizing surfaces with only a single roller necessary. The length around the periphery of each texturizing surface is at least equal to the length in the intrack direction of each image to be texturized.

FIG. 7 illustrates the same concept but with three texturizing surfaces 81, 82 and 83 around an endless surface on ferrotyping web 52. Again, the length of each texturizing surface is equal to (or greater than) the length of each receiving sheet 1 to be texturized.

FIG. 8 illustrates the use of texturizing surfaces 71, 72 and 73 on texturizing backing roller 70. Texturizing surfaces 71, 72 and 73 are periodically rotated by the drive on texturizing station 5 (not shown), into operative positions for receipt of receiving sheet 1. A pair of rollers 91 and 92 are driven by a separate motor 93 to feed receiving sheet 1 into the nip between ferrotyping web 52 and roller 70. An optical sensor 95 senses a mark 75 on roller 71 indicating the exact intrack position of the roller and, therefore, the location of the three texturizing surfaces 71, 72 and 73 once each revolution and feeds a signal indicative of that mark passing sensor 95 to logic and control 65. By suitable timing means, for example, an encoder on roller 70 or additional marks on roller 70, logic and control 65 signals motor 93 to drive rollers 91 and 92 to feed receiving sheet 1 into the nip between belt 52 and roller 70 in proper timed relation with texturizing surfaces 71, 72 and 73.

Rollers 91 and 92 are typical of feed mechanisms presently used in copiers to feed receiving sheets into appropriate registration with images at transfer stations and are capable of correctly positioning an image and receiving sheet in response to a signal from a detector such as optical detector 95. Picking the desired texture for the receiving sheet 1 is accomplished by the operator choosing between textures A, B and C at a switch 98, which choice is fed into logic and control 65 which, in cooperation with the signals from sensor 95 and the encoder, delays the feeding of sheet 1 until the appropriate texture approaches the nip between roller 70 and web 52.

If texturizing station 5 operates three times as fast as sheets are received to be texturized, then the texturizing device can operate at a constant speed and still keep up with the rest of the apparatus. Because a multicolor image is generally a combination of three or more separate images which must be combined at transfer station 3, this will generally be the case. However, if the texturizing process is not fast enough to keep up with the apparatus when operated at a constant speed and utilizing only one-third of the roller 70's surface, the motor 99 driving station 5 can be made a variable speed motor which accelerates as the receiving sheet 1 separates from web 52 and slows down again as the next receiving sheet is received in the nip between web 52 and roller 70.

The general scheme shown in FIG. 8 may also be used when web 52 is segmented as shown in FIG. 7.

The structure shown in FIG. 1 is shown with cut receiving sheets 1. However, it may also operate with a continuous sheet that is severed into cut sheets after the fixing and texturizing stations. Separate cut sheets are generally preferred for certain types of transfer, as mentional above, but a continuous sheet has many advantages in handling through the finishing stations.

The invention has been described in detail with particular reference to a preferred embodiment thereof, but it will be understood that variations and modifications can be effected within the spirit and scope of the invention as described hereinabove and as defined in the appended claims.

We claim:

1. Apparatus for treating a receiving sheet, which sheet is made up of a thermoplastic layer on a paper support, and which thermoplastic layer carries a multicolor toner image, to impart a texture to said thermoplastic layer and said image, said apparatus comprising:

- means for heating said thermoplastic layer to at least its glass transition temperature,
- first and second pressure members, said first member being hard and smooth, and said second member being hard and having a textured surface,
- means for feeding said sheet between said pressure members with the thermoplastic layer contacting said first member, and
- means for applying sufficient pressure between said pressure members to impart a texture defined by said surface of said second member to said image and thermoplastic layer.

2. Apparatus according to claim 1 wherein said second pressure member is a metal roller with a texturizing surface.

3. Apparatus according to claim 2 wherein said second pressure member is a roller having a chrome texturizing surface.

4. Apparatus according to claim 2 wherein said second pressure member is one of a plurality of metal rollers each having a different texturizing surface which can be selectively placed in operative relation with the first pressure member according to the texture desired on a particular sheet.

5. Apparatus according to claim 2 wherein said second pressure member includes a plurality of texturizing surfaces and said apparatus includes timing means for selecting between said surfaces and timing means for assuring that a selected surface is in operative relation with a corresponding receiving sheet to be texturized.

6. Apparatus for treating a receiving sheet, which sheet is made up of a thermoplastic layer on a paper support, and which thermoplastic layer carries a multicolor toner image, to impart a texture to said thermoplastic layer and said image, said apparatus comprising:

- means for heating said thermoplastic layer to at least its glass transition temperature,
- first and second pressure members, said first member being a web backed by a roller, said web having a hard, smooth, metallic surface and said second member being a hard roller and having a textured surface,
- means for feeding said sheet between said pressure members with the thermoplastic layer contacting said first member, and
- means for applying sufficient pressure between said pressure members to impart a texture defined by said surface of said second member to said image and thermoplastic layer.

7. Apparatus according to claim 6 including means for heating said roller backing said web.

8. Apparatus according to claim 7 wherein the apparatus includes no means for heating said second pressure member.

9. Apparatus according to claim 7 wherein said means for heating includes means for heating said receiving sheet prior to it being contacted by said pressure members.

10. Apparatus according to claim 6 including means supporting said web for movement through a path which path includes a portion in which said web and sheet are unheated to allow said layer to cool below its glass transition temperature and through a portion in which said web makes an abrupt turn to separate said web and said sheet after said web has been through said cooling portion.

11. Apparatus according to claim 6 including means for heating said roller backing said web and wherein said web is supported through a path that wraps said backing roller prior to contact with said thermoplastic layer to preheat said web prior to such contact.

12. Apparatus for treating a receiving sheet, which sheet is made up of a thermoplastic layer on a paper support, and which thermoplastic layer carries a multicolor toner image, to impart a texture to said thermoplastic layer and said image, said apparatus comprising:

means for heating said thermoplastic layer to at least its glass transition temperature, said heating means including means for heating said receiving sheet prior to it being contacted by said pressure members, first and second pressure members, said first member having a hard, smooth, metallic surface, and said second member being hard and having a textured surface, means for feeding said sheet between said pressure members with the thermoplastic layer contacting said first member, and means for applying sufficient pressure between said pressure members to impart a texture defined by said surface of said second member to said image and thermoplastic layer.

* * * * *